April 15, 1958 L. W. PARKER 2,831,105

TELEVISION DISTRIBUTION SYSTEM

Filed April 7, 1952 4 Sheets-Sheet 1

INVENTOR.

Louis W. Parker

BY Moore and Hall

TELEVISION DISTRIBUTION SYSTEM

Filed April 7, 1952

INVENTOR.
Louis W. Parker
BY
Moore and Hall

INVENTOR.
Louis W. Parker
BY Moore and Hall

April 15, 1958 L. W. PARKER 2,831,105

TELEVISION DISTRIBUTION SYSTEM

Filed April 7, 1952 4 Sheets-Sheet 4

INVENTOR.
Louis W. Parker
BY Moore and Hall

United States Patent Office 2,831,105
Patented Apr. 15, 1958

2,831,105

TELEVISION DISTRIBUTION SYSTEM

Louis W. Parker, Great Neck, N. Y.

Application April 7, 1952, Serial No. 280,927
17 Claims. (Cl. 250—15)

This invention relates to a television signal distribution system the instant case being a continuation-in-part of my copending application Serial No. 12,217, filed March 1, 1948, for "Television Distribution System," now abandoned.

Present television sets have a bad feature of radiating sufficiently to cause sets to be undesirably affected as far away as one mile. Lines are caused in the picture of the distant set. That situation exists even in spite of radio-frequency amplifiers in the receivers. It is so serious as to impose limits upon the growth and expansion of the television industry, all of which is already realized.

A primary object of this invention is to eliminate that interference between sets so any number of them can be used in even a small region or in a building, without troublesome interference as now experienced.

Present sets also require costly installations, which further decreases public acceptance. A further object of this invention is to provide a simplified system wherein the average owner can install his own television receiver as is now possible with broadcast receivers.

Another object of this invention is to provide a receiving and transmission system for high frequencies such as televison frequencies and for distributing them to regions where reception from main transmitting stations is poor or entirely ineffective, by means of a local relay system which obtains its signals from the main stations.

Another object of the invention is to provide a system wherein the same signal level may be maintained in the receivers regardless of the number of them in use.

In large buildings, such as hotels and apartment houses, there is considerable difficulty encountered in operating a large number of television receivers. This is due mainly to the fact that ordinarily each receiver requires an individual antenna on the roof and a separate lead-in wire or cable or transmission line from this antenna to the receiver. The problem is sometimes solved by the use of a master antenna for the entire building with an amplifier to supply signals to a local cable or transmission line from which all of the receivers may be locally energized to receive a selected television signal.

While such a system can be made to work satisfactorily, its cost of installation is usually prohibitive for general application because of the high cost of installing the cables or transmission lines from the master antenna to the individual television receivers.

An important object of this invention, therefore, is to provide a receiving and distribution system which will eliminate the need for such cables or transmission lines and thereby simplify as well as reduce the cost of installation of a suitable television distribution system.

This system generally comprises a master receiving antenna and a master television receiver for tuning a desired television station. When several stations are available in the geographical region where the building is located and where signals from all of the stations are to be received and distributed to the receivers in the building, a separate master antenna and a master receiver are provided for each station whose signals are to be brought into the building.

When the signal frequency band for each station is tuned in and detected at a master receiver, the detected television signal comprised of picture and sound signal bands, including the video signal of the picture signal carrier frequency and the frequency modulated sound signal carrier frequency, is utilized to modulate a local ultra-high-frequency transmitter. That local transmitter then serves as a relay transmitter to rebroadcast the detected television signal on that transmitter carrier frequency within the building or buildings to be served in a generally small or confined or localized geographical region. In addition to the individual local modulated transmitter for each separate television signal, a common local ultra-high-frequency transmitter is utilized to supply an unmodulated ultra-high-frequency. That common U.-H.-F. is heterodyned with the signal re-transmitting U.-H.-F. carrier frequency to provide a difference frequency corresponding to the carrier frequency to which the associated television receiver is tuned to bring in a particular television station.

The heterodyning action to obtain the difference frequency between the unmodulated common transmitter frequency and the modulated re-radiating transmitter frequencies is accomplished at the local receiver by a suitable converter. The difference frequencies thus derived may correspond to the standard television bands. The frequency converter is located at each local receiver and provides a simple means for picking up and changing the frequency of the re-radiated transmission carrier. A short line from the crystal frequency converter is used to carry the R.-F. television signals to the television receivers, which may be otherwise of conventional design.

In order to simplify the re-radiation of the detected television signal including both the sound signal and the video signal derived at the master receiver for any particular station, I employ the invention disclosed in my application Serial No. 544,726, filed July 13th, 1944, now U. S. Patent 2,448,908 (which was granted after the aforesaid copending application Serial No. 12,217 was filed), relating to Television Receivers, in which the complete television signal, including both the picture signal carrier frequency and the sound signal carrier frequency with their respective modulations, is received and amplified in a common amplifying channel in a T.-R.-F. receiver or in a common I.-F. channel in a receiver of the super-heterodyne type. The amplitude modulated picture signal carrier frequency and the frequency-modulated sound signal are then transmitted through the amplifying channel as one wide frequency band.

At an appropriate point either at the end of the amplifying channel or at an intermediate point of that channel the picture and the sound signal carrier frequencies are supplied to a non-linear device in order to heterodyne those two carrier frequencies to provide a resultant difference or beat frequency that will carry the frequency modulation of the sound signal thereon. The frequency difference between the picture signal carrier and the sound signal carrier will be maintained substantially constant at the television broadcasting station transmitter. That frequency may therefore be utilized as the center tuning frequency for a frequency-discriminator in order to detect the frequency-modulated sound signal from that beat frequency carrier, to which the sound signal was transferred during the heterodyning actions.

At the same time, the amplified video signal output may be supplied directly to a kinescope to reproduce the picture signal that is on the carrier.

In order to prevent the sound signal from affecting the picture signal, the characteristics of the T.-R.-F. amplifying channel or of the I.-F. channel, are preferably made such that the amplitude of the sound signal carrier is kept to a low value of the order of 5% or less, with respect to the amplitude of the picture carrier frequency.

Since the video signal as thus detected at the master television receiver contains both the picture signal and the sound signal in a relatively continuous frequency band, that complete frequency band containing the entire video signal may be utilized to modulate the ultra high frequency of the re-radiating transmitter. Thus, for example, a television frequency band on the carrier of 60 megacycles will be received by the master receiver, and the re-radiating transmitter will be made to radiate on a carrier frequency of say 1060 megacycles. That re-radiated ultra high frequency transmitter of 1060 megacycles and the radiated frequency of the unmodulated transmitter of 1000 megacycles will then provide the difference frequency of 60 megacycles which will correspond to the initial broadcasting range or frequency of the television station as detected by the frequency converter connected to the local television receiver.

Since the re-radiated or relay transmitter frequencies will be relatively high in the ultra high frequency range, the antennas for locally receiving such local re-radiation may be relatively small dipoles, which can be conveniently located on the outside of a window sill in one form of the invention, or actually within the television cabinet itself in another form of the invention.

Where the outside dipole may be employed, the ultra high frequency re-radiating relay transmitters may be disposed outside of a building to be served, as for example on the roof, or at the edge of a wall of the building, preferably not too close to the outside plane of the wall, or, it may be arranged, for example, to beam to receiving buildings in the neighborhood, across the street, or across an area.

Where an internal type of receiving antenna at the receiver is employed, the ultra high frequency radiating transmitters may have their antennas or dipoles located within the area of the building outline and beamed to transmit the radiation downward through the building. In that case, carrier frequencies should be selected to have such value that the wave length will be sufficiently short to be able to enter the various rooms or halls or other similar passages throughout the building which may function under those conditions as wave guides.

In still another form of the invention which may be generally applied in many rooms that have cooling and ventilating systems, I propose to utilize the air ducts throughout the building as wave guides for the re-radiated signal carrier frequencies. In that manner, the signals may be easily directed and transmitted through those ventilating or air-conditioning ducts to suitable dipoles mounted on the gratings at the outlet of the air ducts. The signals picked up by those dipoles are supplied to the local frequency converter at the receiver and the carrier frequencies are then demodulated to obtain the desired frequency carrier or band containing the signal from the desired television station.

This invention is especially suited to utilize a new tuner at the receiver, and particularly a semi-fixed tuned device suitable for tuning tuned radio frequency receivers, oscillators, input circuits for radio receivers, television receiver and the like.

Present television broadcasting frequency bands are distributed among thirteen spaced channels of six megacycles each, within the frequency range from 44 megacycles to 216 megacycles. At present, two general tuning arrangements are employed to tune a television receiver to a selected channel.

In one tuning arrangement, the receiver is provided with thirteen sets of pre-tuned circuits, respectively tuned to the frequency or frequency bands of the respective television channels. A thirteen-position switch is connected to the pre-tuned circuits and is operable at will to connect the receiver to any selected set of the pre-tuned circuits.

Present television receivers are mainly of the superheterodyne type, which require tuning of the antenna or radio frequency stage, a first detector or converter stage, and a local oscillator, according to the frequency or frequency band of the selected channel. A set of pre-tuned circuits therefore includes three pre-tuned circuit elements, and the tuning switch for such a receiver is provided with three ganged sections, each having thirteen points or positions, for simultaneously connecting a set of pre-tuned circuits to the receiver at each selected switch position.

When new, the tuning adjustments of the pre-tuned circuits in such an arrangement may be exact. However, occasionally even after a short period of service, and frequently after a long period of service, the tuning will drift, due to drifting of the inductance or capacity in the receiver, or due to ageing of the tubes, or due to thermal changes, or the like. For these reasons, a receiver with such a tuning arrangement must have a selector switch of the type described for channel selection and connection, and also an auxiliary or trimmer condenser with a fine tuning knob to provide a compensating adjustment for the drift.

The user is thus compelled to perform two operations with separate knobs, that is, one operation of the switch for channel selection and one operation for fine adjustment of the condenser. To the average user, who is relatively an amateur, such double operations are psychologically disturbing.

One object of this new tuner, therefore, is to provide a simple and inexpensive tuning device that is easy and simple to operate, with a single operating knob, and that is particularly useful for a television receiver, and that will select a desired channel and also provide a degree of tuning that will be sufficient to compensate directly for the usual drift in the receiver.

In another tuning arrangement that is now used, a continuous tuning inductance is employed with a movable contact which requires only one adjusting operation by the user, who will consequently hardly ever notice receiver drift. The trouble with this arrangement, however, is that accurate tuning over the entire tuning range of nearly 200 megacycles requires so many revolutions of the tuning knob that a manual tuning operation would be slow. The commercial unit used for this purpose is therefore provided with an electric motor for fast rotation of the tuning shaft that is operable by the knob. Moreover, that tuning arrangement utilizes a sliding contact on a wire, and after long usage, such an arrangement may introduce noise into the system. The greatest disadvantage of that system, however, is its high cost of manufacture.

The invention disclosed herein is intended to combine and utilize the good features of both arrangements referred to, and to eliminate their disadvantages.

Another object of this invention, therefore, is to provide a simple and inexpensive tuning unit to provide both broad range or step operation for quick channel selection, and fine or gradual operation for close resonance tuning, both by operation of a single tuning knob so the user will be unaware of the fact that two operations are involved.

Another object of this invention is to provide a simple tuning unit assembly suitable for a single circuit and which may be assembled in multiple for gang operation, for tuning several co-operating stages, with a single operating knob for the multiple unit thus formed.

Another object of this invention is to provide a simple tuning device for semi-fixed tuning system, including a multi-point switch connected to a circuit with a plurality of inductive circuit elements, the tuning device serving to tune the circuit through adjacent bands in a selected range of the frequency spectrum, with a variable condenser arranged to co-operate with the switch in such manner that the movement of the condenser into its maximum position and its movement out of its maximum position are respectively utilized for tuning the circuit to two frequency bands adjacently disposed for selection by the switch.

Another object of this invention is to provide a simple tuning device including a plurality of inductance elements pretuned to a series of frequency bands over a wide range of the frequency spectrum, with a switch for selectively connecting the inductance elements to a utilization circuit, and a variable condenser operable with the switch for fine resonance tuning at any selected switch position, and the condenser having a diminished tuning area at the upper part of the tuning range.

The manner in which the various components of the system are disposed to obtain the desired functional relationship for this invention, is illustrated in the accompanying drawings, in which:

Figure 1 is a schematic block diagram of the over-all radiation system;

Figure 2 and Figure 2*a* are, respectively, front and side elevational views of a window sill box containing receiving dipoles for the local radiation;

Figure 6:
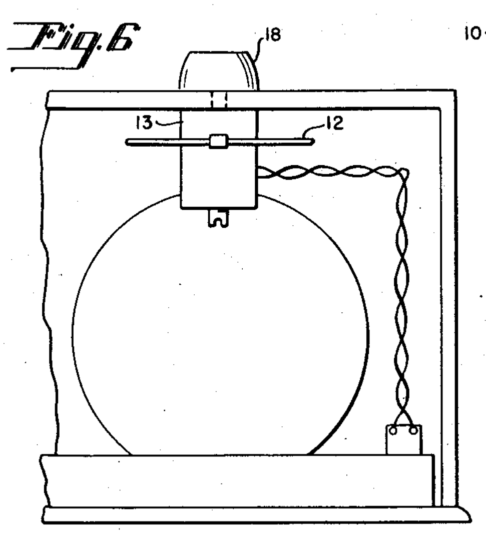
Figure 7:
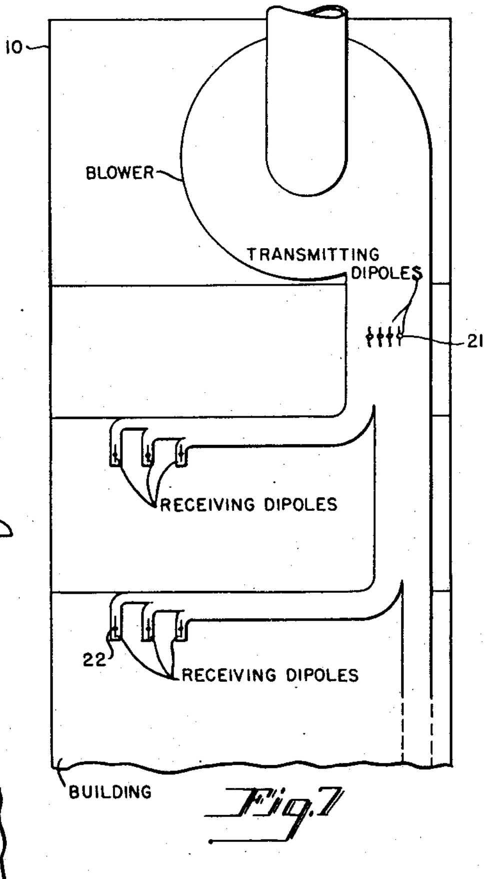
Figure 6A:
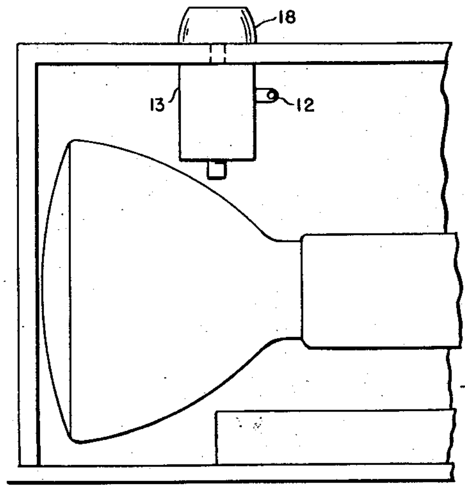

Figure 6 is a front elevational view, and Figure 6*a* is a side elevational view, of the television receiver cabinet with the front and the side wall, respectively, removed to show the disposition and general arrangement of a cavity resonator and dipole disposed to serve as a local antenna for the television receiver; and Figure 7 is a schematic mechanical diagram of the air ventilating system for a building, illustrating the manner in which the various ducts may be employed as wave guides for the re-radiated energy signals to the dipoles for the local receivers in the building, where such a distribution system is employed.

Figures 8, 9:
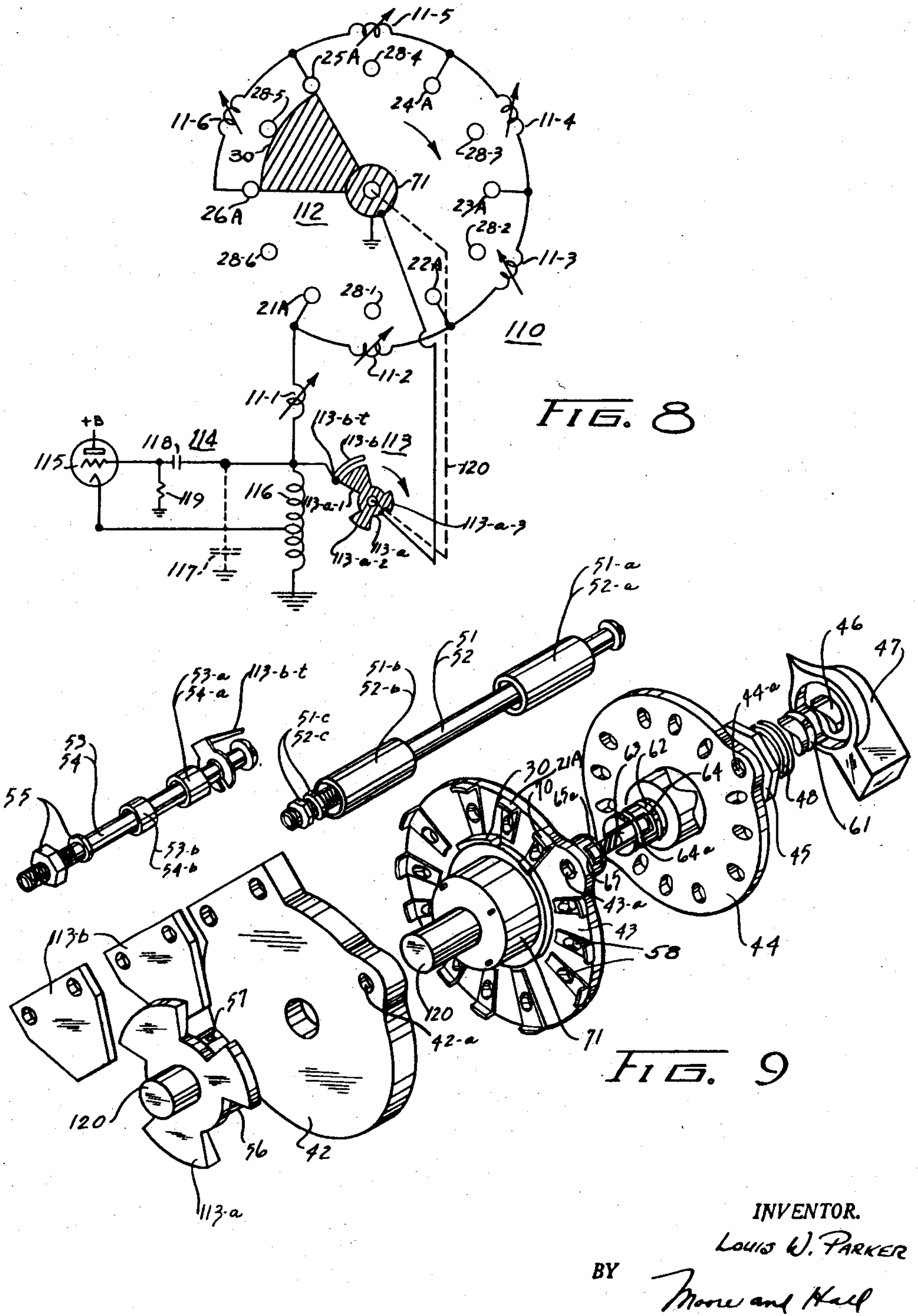
Figure 10:
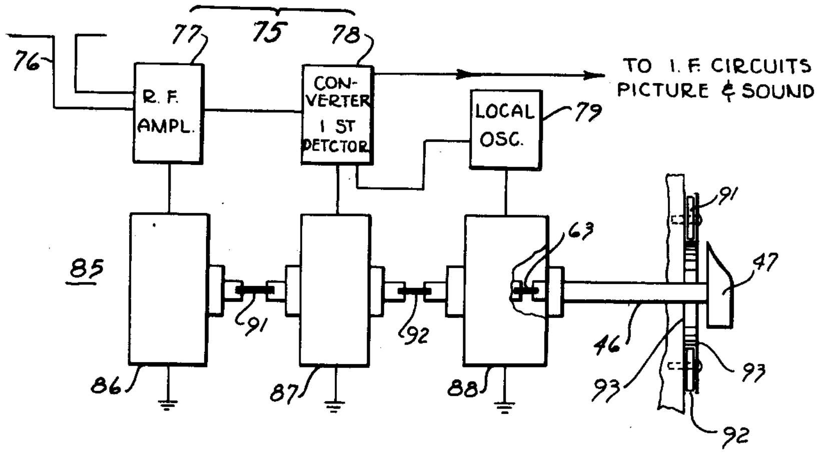
Figures 11, 12:
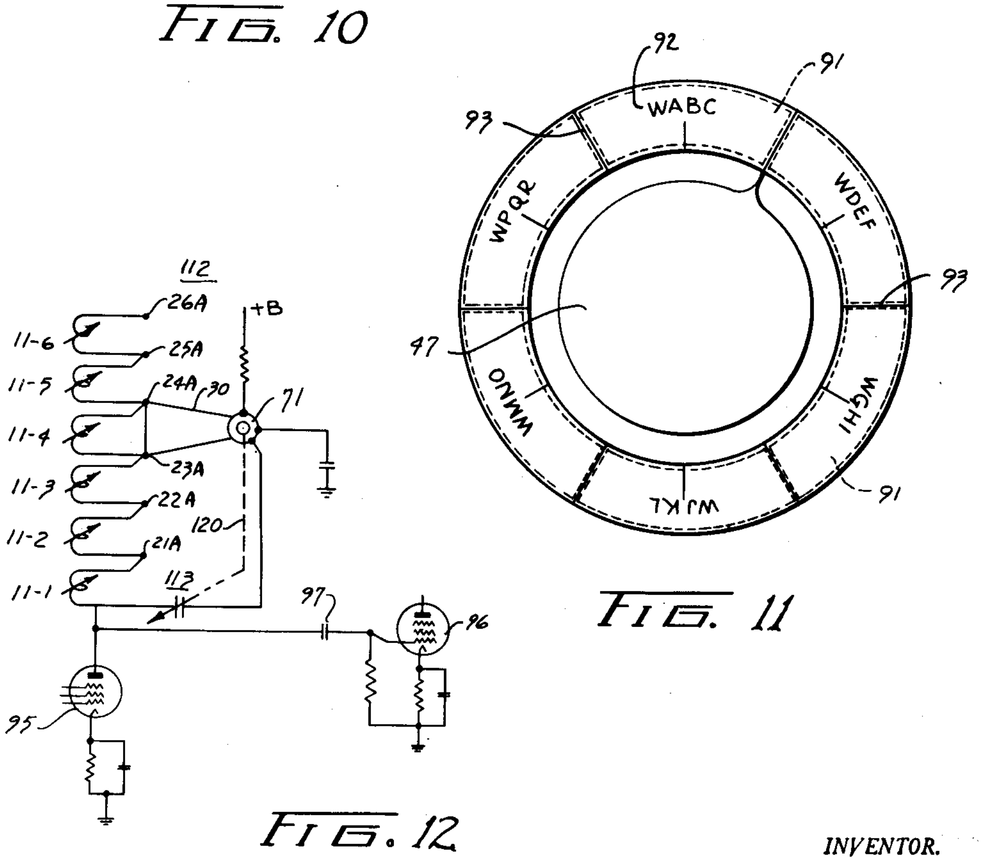

Fig. 8 is a diagrammatic view of an oscillator circuit tuned by the tuning unit of this invention;

Fig. 9 is an exploded perspective view of a single stage tuning unit;

Fig. 10 is a simple block diagram of the front end of a superheterodyne receiver in which a three section ganged tuning unit of this invention is applied;

Fig. 11 is a front view of a card adjacent the knob of a tuning unit, showing the channel identifications; and Fig. 12 is a simple diagrammatic view of an inter-stage semi-fixed tuned circuit in which a tuning unit of this invention is employed.

Figures 1, 2, 2A, 3:
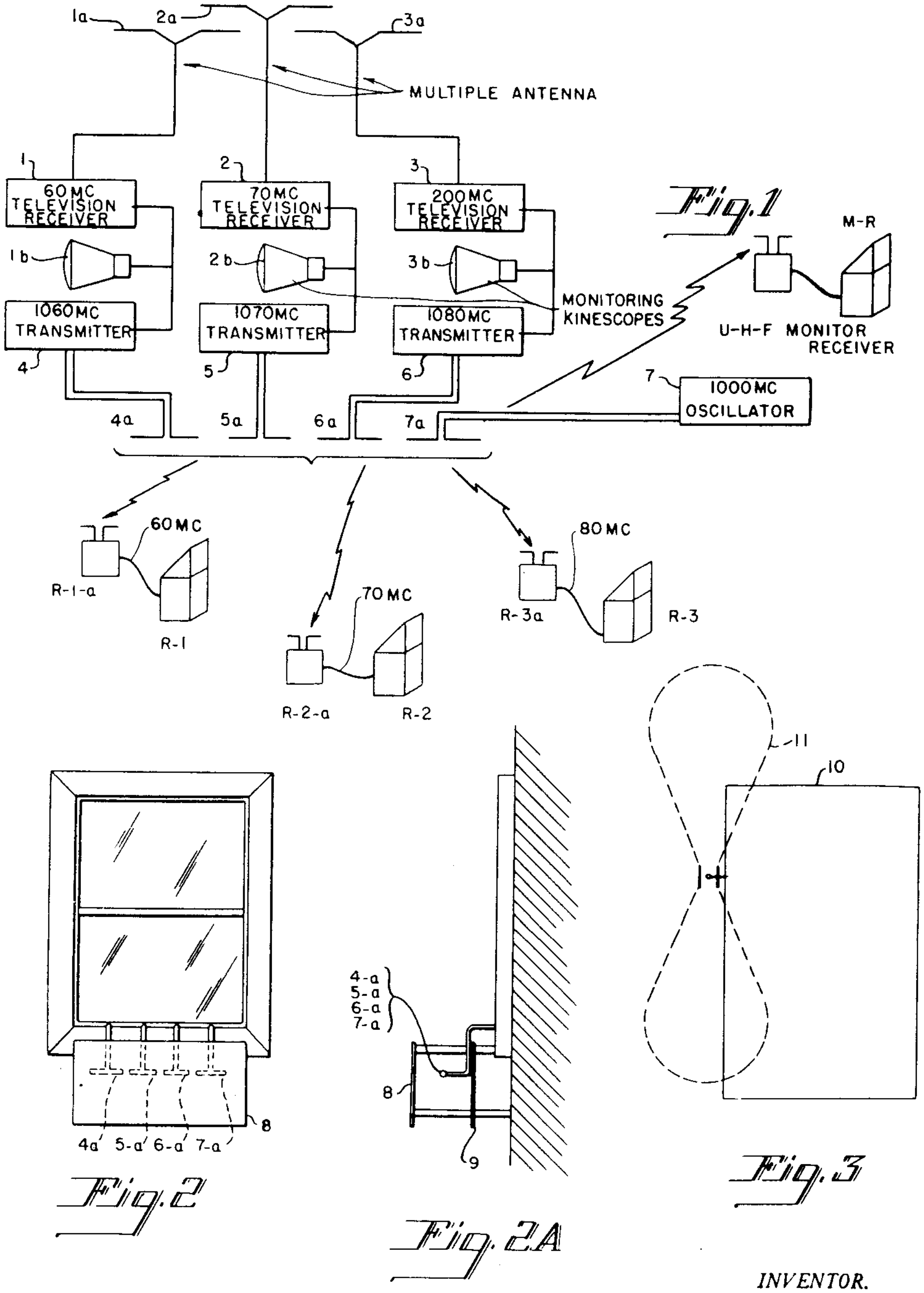
Figure 3 is a schematic view of the field pattern of a dipole with respect to the building.

As shown in Figure 1, a plurality of master receivers are provided to bring in the television signals from a plurality of selected television stations that may be available at the geographical location of that building, or that may be selected from the several stations available at that location.

For purposes of illustration and explanation, only three master receivers 1, 2, and 3 are shown that are energized from their respective antennae 1*a*, 2*a*, and 3*a*, respectively. Further, for the sake of illustration, the receivers are, respectively, designated to tune in television stations having assigned frequency channels of the present conventional six-megacycle widths with respect to the identifying picture carrier frequency, which in these three cases are taken respectively, as 60 megacycles, 70 megacycles, and 200 megacycles. That is, each of these three frequencies, respectively, represents the frequency of the picture signal carrier of the corresponding television signal channel.

These master television receivers 1, 2, and 3 are of the type illustrated, described and claimed in my patent identified above, in which the entire frequency band of the television channel is passed through a common amplifier channel so that the vestigial picture signal band, which is amplitude modulated, and the sound signal carrier frequency which is frequency modulated will both be transmitted through a common amplifying channel. In my aforesaid patent the different portions of the television signal frequency band are selectively amplified in the common channel so that the sound carrying frequency portion of the band is amplified to the order of only about 5% as much as the picture signal frequency portion. For the purpose of this invention, it would be preferable to amplify the sound carrier to as much as 25%. The video frequency obtained after detection in the master receivers 1, 2 or 3 may then be viewed on the associated monitor kinescope 1–*b*, 2–*b*, or 3–*b*, respectively. Of course the 4.5 mc. signal may be further attentuated just before it is fed to picture tube 1*b*, 2*b*, and 3*b*, but the U. H. F. transmitters 4, 5 and 6 should preferably receive 25% of the original 4.5 mc. signal voltage. Additional monitoring of the entire master receiving equipment and the associated reradiating equipment may be done by a U.-H.-F. monitor receiver M.-R.

Except for the small amount of the energy of the picture and sound signal output of the several master television receivers 1, 2, or 3, that is fed to the monitoring kinescope 1–*b*, 2–*b*, or 3–*b*, that picture and sound signal output (VF and 4.5 mc. FM signal) is then used to respectively modulate each of several ultra high frequency carrier frequencies for re-radiating those detected and remodulated signals within a local region containing one or more buildings to be supplied by the relay system thus represented.

As shown in Figures 1, 2 and 3, ultra high frequency transmitters are provided, identified as 4, 5 and 6 that are, respectively, to be modulated by the television signals from the master receivers 1, 2, and 3.

The frequencies of transmitters 4, 5, and 6 are designated, by way of example, to operate at the indicated frequencies of 1060 megacycles, 1070 megacycles, and 1080 megacycles, respectively. In order to provide for a simple frequency conversion of the ultra high frequency carrier frequencies, an unmodulated oscillator 7 is employed to also radiate an ultra high frequency of 1000 megacycles.

Each of the transmitters 4, 5, 6, and 7 is arranged to supply its energy for radiation or re-radiation to associated dipoles antennas 4–*a*, 5–*a*, 6–*a*, and 7–*a*, respectively.

As indicated in the diagram of Figure 1, all of these four ultra high frequencies are now radiated into a relatively localized region to energize the local television receivers R–1, R–2, R–3, etc., respectively. Each local receiver is provided with an energizing dipole antenna and frequency-converter R–1*a*, R–2*a*, R–3*a*, etc.

Through its converter R–1*a*, the receiver R–1 is designated as receiving for the purpose of this description the frequency of 60 megacycles, corresponding to the signal frequency received by the master receiver 1 from the station operating on that frequency. Similarly, receiver R–2 is designated, for example only, as receiving and being tuned to the frequency of 70 megacycles to indicate that it is receiving the signal frequency from the station to which the master receiver 2 is tuned. Receivers R–1 and R–2 could, of course, be tuned to any of the other station frequencies, since the converter at each receiver makes all the station frequencies available as the beat frequencies derived from the heterodyning action between the 1000 mc. frequency and those of the other transmitters.

Receiver R–3 is designated as receiving a signal carrier frequency of 80 megacycles, corresponding to the frequency difference between the local ultra high frequency modulated transmitter 6 and the high frequency unmodulated transmitter 7. This describes a type of reception that may be dictated by certain local conditions which may make it desirable to bring in a television signal from a station operating on a frequency of 200 megacycles, for example, but to deliver it to the local receiver R–3 at a different frequency so that the local receiver R–3 in this case may tune in that television signal on a carrier frequency of 80 megacycles instead of on the frequency on which the original signal was radiated from the television station transmitter.

The feature just described with respect to receiver R–3 provides a method of procedure whereby a signal brought in by the master receiver may be re-broadcast through the relay system described herein on a television channel that has not been assigned and is not used within that geographical location.

This changing of channel frequencies to permit use of an otherwise unused channel is a very important part of my invention. It provides the advantage that no matter what new allocations of broadcasting frequencies may be made for television transmission, existing home receivers used with the system described herein could continue in use and would not have to be replaced or altered since the master receiver and the retransmitting equipment would take care of any shift of television frequency allocations.

An additional advantage of rebroadcasting or relaying the signal locally on a different broadcast channel is that interference is avoided between the demodulated U.-H.-F. signal and the signal that may be picked up directly from the television transmitter. By rebroadcasting on an unassigned channel there will be no interference between the rebroadcast signal on the non-assigned channel and the frequency of a broadcast system on a channel assigned in that geographical location and otherwise available to other receivers within the community.

One method by which the original demodulated signals at the master receivers may be rebroadcast in very simple fashion is illustrated for example in Figures 2, 2*a* and 3. The four dipole antennas 4*a*, 5*a*, 6*a*, and 7*a* for reradiating the signals from the main master receivers 1, 2, and 3 may be mounted, for example, as shown in Figures 2, 2*a*, and 3, on the outside of a window sill, or at the cornice of a building, or on a suitable support, such as an overhanging beam or pole at the top or side of the building, in order to generate a resultant field pattern from each antenna which shall correspond substantially to that shown in Figure 3. As viewed in Figures 2 and 3 the dipoles are arranged to radiate their fields vertically up and down. Two metallic sheets 8 and 9 may be preferably employed to provide initial directional guidance to the fields in any desired direction however, which may be such as shown in Figure 3, where the field is to take care of the occupants of its own building, or to provide a field pattern in other directions to take care of other adjacent regions or buildings.

The dipoles may be mounted as shown so that they will be relatively close to the building 10, or, as indicated above, they may be supported in other ways or at greater distances from the building to provide the desired field pattern.

Depending upon the dimension of the region to be covered, the power available at each of the transmitters 4, 5, 6, and 7 may be provided accordingly. Ordinarily, for the use of the immediate building, the transmitters 4, 5, and 6 would operate adequately on about 1/100 watt of peak power, whereas the common transmitter 7 could be made of sufficient size to radiate about 1 watt of power. However, for a large building or area, this power should be increased considerably.

The use of the metal sheets 8 and 9 will ordinarily prevent most of the radiation in a horizontal direction and will confine it substantially to the vertical direction so that the radiation pattern will be substantially as shown by the out-line 11 of Figure 3.

As already indicated, the local receivers R–1, R–2, and R–3 as used herein, may be conventional receivers or they may operate in accordance with the principle of the invention in my aforesaid patent and in the same manner as is described for the master receivers 1, 2, and 3. In that case, a signal that is the total television signal will contain both the picture and the sound components and may be separated in the receiver in accordance with my patented invention utilizing a common channel for picture and sound signals.

For the purpose of this relaying system, however, the ultra high frequency converter at each local receiver is required in order to convert the V. H. F. signal frequency from the retransmitted ultra high frequency. The converter corresponding to R–1*a*, etc., associated with each local receiver R–1, etc. of Figure 1 is constructed substantially as shown in Figure 4.

Figure 4:
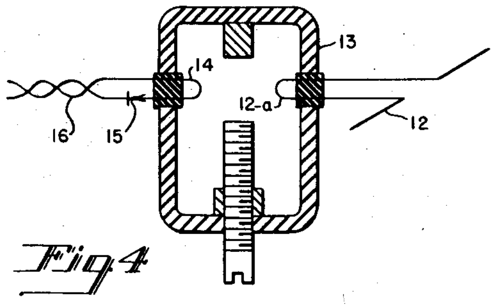
Figure 4 is a simple schematic diagram of a cavity resonator utilized as a frequency detector.

As shown in that Figure 4, the converter comprises the small dipole antenna 12 which may be mounted on or near a window or window sill, similar to the disposition shown in Figure 2 in order to receive the signal as reradiated by the antennae of Figure 2. In another arrangement, as will be referred to later, in connection with Figures 6 and 6*a*, the dipole antenna 12 may be mounted directly in the cabinet of the television receiver. In either case the dipole 12 is connected to energize an input loop 12*a* in a cavity resonator 13.

Figure 5:
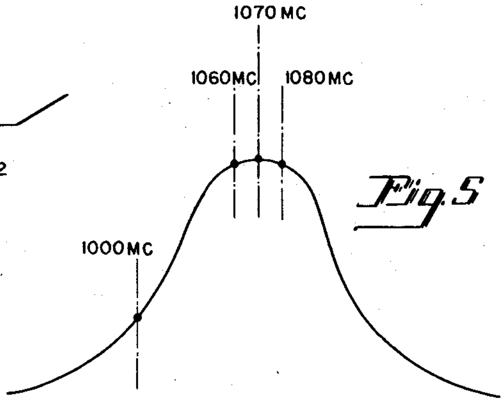
Figure 5 is the selectivity curve of the cavity resonator.

The resonator 13 may be tuned to the middle of the portion of the spectrum of the detected frequency band covered by the frequencies of re-radiating transmitters (U.-H.-F.) 4, 5, and 6, which are distributed on the frequency spectrum and frequency characteristic as shown in Figure 5. Of course this resonator 13 may be tuned differently for example in such a way as to increase the 1000 mc. unmodulated signal by placing it in the middle of the resonance curve. Energy is taken from the cavity resonator 13 by an output loop 14, and the voltage therefrom is rectified by a crystal detector 15 and then supplied to a twisted transmission line 16 which acts as a low pass filter to eliminate the U.-H.-F. carriers and transmit only the lower difference frequencies. The twisted line 16 provides the input signal for the receiver, as R–1 which then amplifies and detects that signal in the conventional manner to obtain the picture and the sound components for reproduction in the associated picture tube and loud speaker.

The antenna coil in receiver R–1 must not have a condenser in series, except if the condenser is bridged by a resistor to prevent the blocking of the D. C. component generated by crystal 15. The detector 15 that is energized from the cavity resonator provides the non-linear action for heterodyning the 1000 megacycle base frequency with the frequency of the re-radiating relay transmitters 4, 5, and 6 to convert and demodulate those relay carriers to obtain the lower television radio frequency therefrom. Due to the accuracy of the 1000 megacycle oscillator and the three relay transmitters 4, 5, and 6, the demodulated signals at the rectifier 15 will be much more accurate in their frequencies than if a small local oscillator had been used at the local receiver for the heterodyning action.

The selectivity curve of the cavity resonator under the loading caused by the input and the output loops is shown in Figure 5, and the curve is of sufficient band width to include the unmodulated high frequency of 1000 mc. In this figure, the effective Q is only about 15. Yet the 1000 megacycle signal is reduced by more than 6 decibels. Due to the higher transmitting power of the 1000 megacycle oscillator, however, this signal is predominant at the rectifying crystal 15, so that the difference or beat frequency between that 1000 megacycle oscillator and the frequencies from the three transmitters 4, 5, and 6 will have a sufficiently small amplitude swing to be entirely detected by the detector 15 without any crippling distortion.

Alternatively, separate tuned cavities may be provided for the several re-radiated high frequencies including the modulated and unmodulated frequencies or only selected ones for deriving desired difference frequencies corresponding to selected station frequencies.

A further advantage of rebroadcasting the television signals on the ultra high frequency carriers from the transmitters 4, 5, and 6 results from the fact that the portion of the frequency spectrum into the cavity resonator is a smaller percentage of the frequency to which the cavity resonator is tuned tending to reduce amplitude distortion of the signal. Increase of the re-radiating frequencies to still higher frequencies would permit use of cavity resonators with still higher Q values.

A very important advantage of the cavity resonator is that it operates to block any feed-back from the lower frequency oscillator in the receiver, that might otherwise be re-radiated and cause interference.

In most cases it may not be necessary to locate the receiving dipoles as shown in Figures 2 and 3, outside of the building. Even in buildings having a metal structure, the receiving dipoles R–1–*a* etc. may be located within the building so long as the radiation frequency is selected to bring the wave lengths within the dimensions of the windows and of the spaces between the floors. The floors and the walls will then act as wave guides and will conduct the short waves by reflection. In such cases the dipole 12 may be mounted in the receiver cabinet, in the manner shown in Figures 6 and 6A, on the cavity resonator 13, with a suitable operating knob 18 for rotating the cavity resonator and the dipole, as a unit, to a position at which the reflected signals that reach the dipole will provide a signal of maximum strength.

In the use of this relay system for retransmitting the signals, the final receivers R–1 etc. will function better when the inter-carrier method of sound reception is employed at the master receiver 1, 2 and 3, as in my aforesaid patent instead of demodulating and separating picture and sound signals and then separately transmitting them, as conventional systems do. Otherwise the frequency of the U.-H.-F. transmitters 4, 5 and 6 may not be stable enough individually for the FM sound discriminator, whereas the difference frequency between the picture and sound carriers, as was broadcast originally by the large broadcast station, may be maintained accurately with the above mentioned intercarrier system to provide an accurate beat frequency carrier for the FM sound discriminator.

The value of this invention is particularly great in connection with the use of my previous invention of handling the picture and sound signals as a unit frequency band for transmission through the entire system until that unit frequency band reaches the ultimate user at the receiver where the picture and the sound are finally to be reproduced.

As previously stated, the relaying transmitters 4, 5, and 6 may operate on 1/100 watt output. Such a transmitter may be made with only two small electron discharge tubes. The construction of such a transmitter is thus inexpensive. Similarly, the 1000 megacycle oscillator 7 may be a single tube unit which is similarly inexpensive. The converters as shown in Figure 4 are tubeless and also inexpensive to make.

In Figure 7 is shown a simple arrangement in which the ducts of an air-ventilating system may be employed as wave guides to conduct the signals from transmitting dipoles 21 to receiving dipoles 22. The transmitting dipoles may correspond in number to the number of station signals to be radiated plus the common unmodulated transmitter dipoles. The receiving dipoles may be mounted on the grating or cover plate for the duct where it entered a room to be served. The receiving dipole may be mounted with the cavity resonator on the grating, and the line such as line 16 from the crystal led to the local receiver. While the dipoles on Fig. 7 are shown oriented in the length of the duct for convenience of illustration, any other orientation or mode of excitation may be used.

For simplicity of explanation and understanding, the description thus far has proceeded on the basis of utilizing this invention with presently available conventional receivers of the superheterodyne type. Such receivers have many disadvantages, the major ones being reception of interfering image frequency and radiation of the local oscillator. These have been tolerated because of the good sensitivity and selectivity which a superheterodyne circuit has.

However, with the system described herein, even though the original broadcasting stations are restricted to narrow frequency separations, original unit frequency bands of picture and sound carriers may be re-radiated at greater frequency spacings, thereby taking care of the problem of selectivity. In this system, high selectivity and sensitivity is required only at the master receiver since the re-radiated signal can be made as strong and spaced as far apart as desired. For example the rebroadcast frequencies of transmitters 4, 5 and 6 could be 1020 mc., 1050 mc., and 1080 mc. Hence, there would be 30 mc. separation between the signals at the receiver even though there is only a 10 mc. separation between the signals at receivers 1 and 2. With this system, it therefore becomes feasible to use the simpler and more economical tuned-radio-frequency receiver which lacks the sensitivity and selectivity of the superheterodyne circuit. The problem of tuning and amplifying at radio frequencies suitable for such a T.-R.-F. television receiver is solved by a tuning and amplifier system such as disclosed in my co-pending application, Serial No. 778,306. The intercarrier sound system of my aforesaid patent mentioned above, that is where the picture and the sound carrier frequencies are transmitted as a single unit frequency band, is also an important part of such a tuned-radio-frequency television receiver.

The use of my patented intercarrier sound system eliminates the need for separate T.-R.-F. receivers for picture and for sound carriers as was conventional, and now will enable one T.-R.-F. receiver to serve the complete purpose of the television receiver.

The general system as described herein will be employed to service one comparatively restricted area. Similarly, many other areas will be serviced by similar installations to blanket a much larger zone which could not be reached adequately by the standard television broadcasting transmitters.

In addition, the different relay or regional installations may be made to operate on their own frequencies in a separate frequency range for each region. In view of the relatively restricted transmitting range of these low power relay transmitters, many regions not immediately adjacent to one another may use the same sets of frequencies.

Thus, in addition to various general objects recited and described throughout the specification, might be added the object of providing a general system of distribution for television signals and the like, and particularly such a distribution system in which the inexpensive relatively insensitive and relatively unselective tuned-radio-frequency receiver may be utilized and again be restored to general usefulness.

For purposes of ease in reading and understanding the tuning and amplifier system referred to in the aforesaid application S. N. 778,306, I am describing below the invention set forth in that application.

The functional operation of the tuning unit is first shown in Fig. 8, as applied to an oscillator. As there shown, a tuning unit 110 comprises a plurality of inductance elements 11–1 to 11–6, inclusive, a multi-position switch 112, and a variable condenser 113. The tuning unit thus constituted controls an oscillator circuit 114, which is illustrated to include a triode 115, a tunable circuit including an inductance coil 116 and an optional condenser 117, a grid coupling condenser 118, and a grid leak resistor 119.

The oscillator may be tuned to various frequencies by connection of one or more of the inductance elements 11–1 to 11–6, inclusive, to parallel the inductance coil 116 and the condenser 117. The variable condenser 113, with rotor 113–*a* and stator 113–*b*, is provided for fine or close tuning of the circuit to resonance at any selected frequency.

As indicated by the broken line 120, representing the shaft section for switch 112, the condenser 113 is operated simultaneously and may be mounted on and operated by a separate shaft section insulated from the switch shaft section 120, or it may be mounted on the same switch shaft section, as shown here.

The switch 112 is illustrated schematically as comprising six stationary active contacts 21A to 26A, inclusive, equally spaced in a circular locus, with six similar stationary inactive contacts 28–1 to 28–6, inclusive, alternately disposed between the active contacts in the circular locus, and a movable contact blade 30 continuously rotatable by the switch shaft section 120 in either direction to engage the stationary contacts in sequence.

The movable contact 30 is of such width as to just span the space between two adjacent active contacts, so that the advance edge of the movable contact will engage the forward stationary contact just as the trailing edge of the movable contact 30 will disengage the adjacent rearward stationary active contact. The inactive contacts shown between the active contacts help to maintain the movable blade 30 in its proper plane, since the stationary contacts are preferably made to have a sliding jaw action to embrace the movable blade. In the switch 112 as shown, six active stationary contacts or switch contact positions are provided. The span of the movable blade contact 30 is therefore about one sixth of a rotation, or $1/N$ where N represents the numbers of active switch positions. That means the movable contact 30 can maintain contact during one-sixth of a rotation of the switch shaft 120.

The variable condenser 113 is therefore arranged to be similarly effective through $1/N$ rotation and is provided with a rotor plate 113–*a* having $N/2$ or three sections, identified as 113–*a*–1, 113–*a*–2, and 113–*a*–3, equally spaced and of equal angular widths $1/N$, since each rotor section will serve two switch positions, that is, each rotor section will tune the circuit at one switch position as the rotor section moves in from its minimum capacity position to its maximum capacity position, relative to the stator and will tune the circuit at the next advanced switch position as the rotor section moves out from its maximum capacity position to its minimum capacity position relative to the stator. A stator terminal 113–*b* serves to connect the stator 113–*b* to an external circuit.

The condenser rotor 113–*a* is mounted on a shaft section connected to the switch shaft section 120 and is movable past the co-operating condenser stator section 113–*b* which has an angular width $1/N$ corresponding to the angular width of one rotor section.

Each condenser rotor section will therefore be adjustable throughout its entire range and angle while the movable switch contact 30 maintains engagement with the corresponding active stationary contact connected to a selected inductance. As the movable contact 30 progressively moves from one switch position to the next, the corresponding sections of the condenser rotor 113–*a* are sequentially moved into operative tuning position relative to the stator 113–*b* of the condenser.

The capacity of the respective condenser rotor sections may differ, and the capacity of each rotor section may be made such as to enable the frequency of the oscillator to be variably adjusted through the range between two frequencies corresponding to any two adjacent switch positions, or through spaced ranges, so the tuning unit may be used with the oscillator through a selected range, or through spaced ranges, of the frequency spectrum.

Thus, at higher frequency ranges of the frequency spectrum, the corresponding rotor section may have a smaller area, achieved with a smaller radius since the angular dimension is preferably maintained. Section 113–*a*–2 then has a smaller radius than section 113–*a*–1, and section 113–*a*–3 has a still smaller radius.

The mechanical construction of the switch and condenser unit is shown in the exploded perspective view of Fig. 9. It embodies a first annular ring plate 42 of insulating material to support the condenser stator 113–*b*, a second similar annular ring plate 43 of insulating material to support the stationary switch contacts, and an anchor plate 44 for supporting the entire tuning unit on a suitable bracket or chassis wall. A fastening nut and washer assembly 45 is provided to fixedly secure the anchor plate 44 to the supporting frame or chassis. A main operating shaft 46 serves to rotate the shaft section for the movable condenser rotor 113–*a* and the connected shaft section 120, for the movable contact 30. An operating knob 47 controls the main operation shaft 46.

As previously mentioned, the shaft section for the condenser rotor may be electrically insulated from the switch shaft section 120, by a connecting key or coupling of insulating material, to permit the rotor elements of the condenser and of the switch to be separately connected to external circuits. In the present applications, the two shaft sections are actually one continuous shaft element since both the condenser rotor and the switch blade are connected to the same point of ground potential for the circuits illustrated herein. The insulating connection may be used where the switch blade and the condenser rotor are to be connected to different points.

A bearing sleeve 48 is rigidly connected as an element on the anchor plate 44, and serves as a bearing for the main operating shaft 46. The bearing sleeve 48 is externally threaded to receive the fastening nut 45. When the anchor plate 44 is secured to a chassis by the fastening nut and washer assembly 45, the anchor plate 44 serves as a support for the two insulating annular ring plates 42 and 43 through two side stud bolts 51 and 52 that extend backward from the anchor plate 44 through holes 44–*a* and 44–*b* in the anchor plate 44, and through suitably aligned holes 42–*a* and 42–*b* in the condenser ring plate 42, and holes 43–*a* and 43–*b* in the switch annular ring plate 43. Two cylindrical spacing tubes 51–*a* and 52–*a* fit over the stud bolts 51 and 52 to space the switch annular ring plate 43 from the anchor plate 44, and two similar spacing tubes 51–*b* and 52–*b* fit over the stud bolts 51 and 52 to space the condenser annular ring plate 42 from the switch annular ring plate 43. Nut and lock washer assemblies 51–*c* and 52–*c* on the ends of the stud bolts 51 and 52 tightly secure the switch and the condenser annular ring plates 42 and 43, and the spacing tubes to the anchor plate 44 as a tight rigid stationary assembly structure.

The condenser annular ring plate 42 supports the condenser stator 113–*b*, consisting of two spaced plates, by means of two stud bolts 53 and 54 with suitable spacers 53–*a* and 53–*b* on one bolt, and spacers 54–*a* and 54–*b* on the other bolt, with lock washers and nuts 55 to hold the two plates of the stator 113–*b* rigidly fixed in proper spacing from each other and from the annular supporting plate 42. The terminal 13–*b*–*t* anchored under the head of stud bolt 53 provides the circuit connection element for the condenser stator. The rotor sections move in a medial plane to interleave with the stator plates, the rotor being supported on its shaft section by a ferrule 56 which is tightened onto the shaft section by suitable anchor screws 57 in proper alignment with the movable switch blade 30. So the leading edge of condenser rotor section 113–*a*–1 will just start to enter stator 113–*b* as the leading edge of switch blade 30 just engages active stationary contact 21A.

The switch annular ring plate 43 supports twelve stationary contacts arranged in a circular locus concentrically around the shaft section 120. These contacts correspond to the twelve contacts shown in Fig. 8, including the active and the inactive contacts, and they are secured to the supporting annular ring plate 43 by suitable means such as rivets 58. The stationary contacts are formed of resilient material, such as copper alloy, and are each provided with a jaw section which is formed to be resiliently biassed into and across the path through which the movable contact blade 30 passes as it is rotated by its supporting shaft 120. The movable blade 120 frictionally slides through the jaws of the respective contacts in sequence as the blade is moved through its circular path. In order to keep the movable blade coplanar with the stationary contact jaws, the main shaft 46 is held against axial displacement, from its initial predetermined position, by a snap ring 61 and a clamping ring 62, both secured to shaft 46 and disposed to frictionally engage the front end and the back end, respectively, of the bearing sleeve 48 which is rigidly secured in fixed position as part of the anchor plate 44. The main shaft 46 is connected to the switch shaft section 120 through a key 63 of insulating material extending into end slots 64 and 65 in those shaft sections and held tightly secured by suitable means such as clamping rings 64–*a* and 65–*a*. The restraint against axial movement of the main shaft is thereby imposed on the switch shaft section 120, and ensures the maintenance of the movable contact blade 30 in its original plane.

The condenser rotor 113–*a* is similarly kept in its original plane between the two stator plates 113–*b*, by the axial restraint on main shaft 46.

As shown in Figs. 8 and 9, the condenser rotor 113–*a* and the switch blade 30 are jointly grounded through shaft 120 and a brush contact 70 that always engages ferrule 71 of the blade 30 on the shaft 20.

A switch section and a condenser section, together with a series of inductance coil elements, as described, thus constitute a single or individual tuning section or unit for tuning a single circuit.

When such a tuning device is to be used for a television receiver, for example, where the antenna circuit, the converter and the oscillator are all to be tuned simultaneously, three tuning sections may be connected for ganged operation, as schematically shown in the block diagram in Fig. 10.

As shown in Fig. 10, the important functional components of the front end of a television receiver 75 are shown for illustrative purposes as including an antenna 76, an R.-F. amplifier stage 77, a converter or first detector stage 78, and a local oscillator 79, which feed into the picture and sound I. F. sections for amplification and subsequent detection of the television signals in a manner well known, and forming no part of this invention.

In order to tune the television receiver 75 to the frequency or frequency band of any selected television channel, in accordance with this invention, a tuning device 85, embodying this invention is provided, which consists of three tuning sections 86, 87 and 88, each including a switch section, a condenser section and a series of inductance coil elements as shown in Fig. 8. Each tuning section 86, 87 and 88 is similar in construction to the switch and condenser combination shown in Fig. 2, and the three tuning sections are connected for gang operation by suitable insulating key elements 91 and 92. The entire tuning device thus constituted is operated through the main shaft 46 by the single operating knob 47, similar to Fig. 9. The knob 47, the shaft 46 and the adjacent tuning section 88 are the same as and equivalent to the unit shown in Fig. 9. Tuning sections 87 and 88 are merely two additional units like the switch and condenser assembly of Fig. 9. In each tuning section, the switch shaft section and the condenser shaft section are one, as described in reference to Fig. 9, but each tuning section shaft is insulated from the others, as in Fig. 10.

The switch in each of the tuning sections 86, 87 and 88, is provided with six positions and six connected inductance elements, as in Fig. 8, to selectively tune the television receiver to any one of the six television frequency bands for which the inductance elements are pretuned. The inductance elements for each tuning unit section will be tuned of course for the respective frequencies to be established in or conducted by their associated circuits at the respective television channel frequency bands.

Each condenser rotor section in each tuning section is made of appropriate dimensions to permit continuous tuning over a range of about ten megacycles to permit both fine adjustable tuning of the circuit to the frequency band of the selected television channel at a selected switch position, and also to permit selective and fine adjustable tuning to the frequency band of a television channel whose frequency is between that of the station at that switch position and the frequency of the channel at the next switch position.

With the present allotment of thirteen channels for television, it will rarely, if ever, be necessary to assign two adjacent television channels to the same geographical location. The six switch positions will permit selective tuning to all the channels that will be assigned to the locality where the receiver will be located. In any one location there will be no more than one station for each of six contacts. If the receiver should be moved to a different location, the new stations will appear six mc. away from the previous ones, but since the range of the tuning condensers is about 10 mc., this will present no tuning difficulty. The approximate position of each channel may be marked on the front panel, or this marking may be made by the service man when installing the set. In that case, only the local stations are marked, preferably by call-letters and a line on a tuning scale showing the exact point of tuning.

Since each television receiver under present conditions requires special installation, a small piece of cardboard with the station call-letters printed on it may be supplied by the switch manufacturer, which can be placed in an appropriate holder and a tuning line marked on the cardboard by the service man. Television receivers of present vintage suffer from lack of such markings. They either contain the channel number or frequency. This is because of the great numbers of stations that may occupy the channel at different localities. Yet the call-letters of the station are more publicized and better known by the public than the frequency or channel numbers. With the replaceable cardboard method of call-letter indication a receiver made for the entire country may become specialized for any location, as indicated in Fig. 11.

Since the two frequency spectrum regions assigned to television are spaced below and above a region of the frequency spectrum which includes the spaces assigned to amateur and to frequency modulation uses, the tuning unit herein will serve also to tune in those stations also. For such application, the tuning accuracy and sensitivity should be better than 200 kc.

This is about one-fiftieth of the 10 mc. tuning range assigned to a condenser section, and the latter may be considered as being effective through an angle of 120°, or double its angular width, so the required adjustment that must be readable is 1/50 of 120 degrees or 2.4 angular degrees. A dial of at least 3 inch diameter should be used for such tuning.

By means of a tuning device of the type described herein, a single and inexpensive tuning device and system are achieved, in which only a single operating knob is required, and by which both fast channel selection is possible and subsequent slow gradual fine tuning for accuracy or to compensate for drift.

As shown in Fig. 11, the tuning position for the local channels may be indicated by identification cards 91 inserted into arcuate spaces 92 in an annular card holder 93 supported by means on the enclosing cabinet (not shown) concentrically with the axis of the operating shaft for the tuning unit. Radial strips on the card holder define the dimensions of the card-receiving spaces, and the cards may be properly dimensioned to fit snugly, to avoid any skewing or angular shifting. Suitable means such as leaf springs may be provided as part of the card holder 93 to permit easy insertion or removal of the identification cards, while holding them against displacement by vibration or other casual forces. The location of the card holder 93 directly behind the operating knob is schematically indicated in Fig. 10.

Fig. 12 shows the application of a single section tuning unit of the type and construction illustrated in Figs. 8 and 9 as applied to the tuning of a plate circuit or tank, and for interstage tuning. The elements of the tuning device are identified by the same numerals employed in Fig. 8, and are disposed in the plate circuit of an amplifier 95 which drives the following stage 96 through a coupling condenser 97. The source of the driving signal for the amplifier 95 and the load circuit for the tube 96 are not indicated since this Fig. 12 is intended merely to show the operative combination of a single section tuning unit for tuning the plate circuit of an amplifier alone, or where the amplifier is coupled to another stage to drive that succeeding stage at a desired frequency.

The operation of the tuning device is similar to that shown in Fig. 8, except that the tuning action is within the elements of the device itself, that is, in the pretuned tuning coils 11–1 to 11–6, inclusive, and the variable condenser 113. The coils are pre-tuned, of course, to the proper values to provide the optimum $L/C$ ratios for the frequencies involved.

The tuning unit herein by reason of its selective fine tuning action is also readily adaptable for systems where band spread tuning may be desired. The tuning device may be connected in the appropriate circuit and a suitable tuning dial provided with an appropriate spread over the desired tuning region. The dial indicator or pointer can be connected for operation by shaft 46 and knob 47 through suitable step-up gearing to make several rotations in response to one rotation of the operating shaft 46.

The invention herein is therefore not limited to the specific structures or arrangements shown, but may be variously modified within the spirit and scope of the invention as set forth in the appended claims.

I claim to have invented:

1. In combination, a building and a system of television reception for the building comprising all of the following: a plurality of master receivers of good selectivity one for each television channel to be received, the television channel received by each of said master receivers including both sound and picture signal components, a plurality of local receivers having poorer selectivity than said master receivers and located at various places in the building, transmitters modulated by the output of the master receivers for rebroadcasting their outputs on channels more widely spaced than some of the original channels, and means for altering the ratio of sound to picture signal components in each of said television channels whereby the ratio of sound to picture components is higher in said rebroadcast outputs than it is in the channels received by said master receivers.

2. A system for relaying radio signals from a central station to a plurality of local receivers in a building having passages and openings connecting said station with the receivers, which comprises a master signal receiver at said station, means for reradiating received signals from said master receiver at an ultra high frequency at which the waves will pass through said openings and along said passages acting as wave guides, said means reradiating its signals at a different frequency from the one to which the master signal receiver is tuned and means at each said local receiver for converting said reradiated waves to lower frequencies at which said receiver operates.

3. A system as set forth in claim 2 in which said openings include windows and the reradiating means includes means for radiating waves along the face of the building to said windows.

4. A system for relaying radio signals from a central station to a plurality of local receivers in a building which comprises a master signal receiver at said station, means for reradiating signals received at said master receiver, including a directional antenna system arranged to beam the waves along a wall of the building having windows, and means at each receiver for receiving reradiated waves from a window.

5. A system as set forth in claim 4 in which the reradiating means includes an antenna system located adjacent to the building wall, and shielding means for preventing undesired radiation away from said wall.

6. A system as set forth in claim 4 in which the receiving means includes an antenna extending from a window into the path of said radiated waves.

7. A television receiving system for television signals transmitted on wave bands within an established frequency range, which comprises master receiving means for said signals, a plurality of local receivers in the vicinity of the master receiving means, each including means for tuning to frequencies in said range, and means for transmitting received television signals from the master receiving means to the local receivers which comprises means for retransmitting said received signals at frequencies outside of said range, and means at each receiver for receiving and converting the retransmitted signals to frequencies within said range, in which the means for retransmitting includes means for transmitting an unmodulated wave, and the means for converting includes means for heterodyning the unmodulated wave with the retransmitted signals to produce signal waves in said frequency range.

8. A television receiving system for television signals transmitted on wave bands within an established frequency range, which comprises master receiving means including a plurality of receiving units each tuned to one of said bands, a plurality of local receivers in the vicinity of the master receiving means, each including means for tuning to frequencies in said range, and means for transmitting received television signals from the master receiving means to the local receivers which comprises means for retransmitting signals received by said units at different frequencies outside of said range, and means at each receiver for receiving and converting the retransmitted signals from each unit into a different frequency band within said range, in which the means for retransmitting includes means for transmitting an unmodulated wave, and the means for converting includes means for heterodyning the latter wave with retransmitted signals from said units to produce a different frequency band in said range from signal waves received by each unit.

9. A television receiving system for television signals transmitted on wave bands within an established frequency range, which comprises master receiving means including a plurality of receiving units each tuned to one of said bands, a plurality of local receivers in the vicinity of the master receiving means, each including means for tuning to frequencies in said range, and means for transmitting received television signals from the master receiving means to the local receivers which comprises means for retransmitting signals received by said units at different frequencies outside of said range, and means at each receiver for receiving and converting the retransmitted signals from each unit into a different frequency band within said range, in which the frequencies of retransmission are above said television range, and the means for receiving and converting the retransmitted signals includes a cavity resonator tuned to a band including said different frequencies retransmitted from different units, an antenna arranged to receive and feed the latter frequencies to said resonator, means for feeding to said resonator an unmodulated wave within the latter band, and a resonator output circuit including a detector arranged to pass the modulated beat frequencies produced by heterodyning said retransmitted frequencies and the unmodulated wave.

10. A television distribution system for buildings comprising a plurality of receiving antennae each of which is respectively associated with one of several frequencies to be received with a predetermined frequency range, a plurality of radio frequency amplifiers coupled respectively to each of said receiving antennae, each of said amplifiers being pretuned to one of said several frequencies respectively, a plurality of local transmitters coupled respectively to each of said pretuned amplifiers, said transmitters including means respectively converting the signal frequencies in said amplifiers to output frequencies outside of said predetermined range, a plurality of local radiating antennae coupled respectively to said local transmitters for locally reradiating said output frequencies through said building structure, said building structure including a pre-existing structural duct system, said local radiating antennae being located within said structural duct system, the output frequencies of said locally reradiated signals being so selected that the longest half-wavelength of said locally reradiated signals is shorter than the smallest dimension of said pre-existing duct system in the plane of oscillation of said locally reradiated signals whereby said duct system acts as a waveguide to said locally reradiated signals, and a plurality of local receivers within said building structure for respectively receiving said reradiated signals, each of said receivers including means for reconverting said reradiated signals to frequencies within said predetermined range.

11. The system of claim 10 in which said local receivers include pickup means located within said duct system at locations removed from the locations of said local radiating antennae.

12. A television distribution system for buildings comprising master receiving means including a plurality of receiving units each of which is selectively responsive to different ones of several frequencies to be received, each of said several frequencies to be received including both sound signal and picture signal components in predetermined ratio to one another, said receiving units including means increasing the ratio of sound signal to picture signal components, means respectively coupled to said receiving units for converting the frequencies of said received signals to still different frequencies for local transmission, local reradiating means for retransmitting the several altered ratio signals at said still different frequencies within said building structure along with an unmodulated carrier, and a plurality of local receivers within said building structure selectively responsive to the heat signals between the unmodulated carrier and said reradiated signals.

13. In a system for distributing television signals from a plurality of television broadcast stations to various local receivers in a building, said television signals having sound and picture components in predetermined ratio to one another at said stations; a plurality of master receivers associated with the building and respectively tuned to one of a plurality of frequencies within an established television broadcast frequency range, each master receiver having an output, means connected to the outputs of said master receivers for locally radiating signals respectively modulated by the outputs of the master receivers on frequencies higher than those to which the master receivers are tuned and outside of said frequency range, said locally radiated signals being respectively spaced from the frequencies of the said master receivers by a predetermined frequency and the ratio of sound to picture components in said locally radiated signals being higher than said predetermined ratio, means for radiating a heterodyning signal along with said local radiations, the heterodyning signal having a frequency substantially the same as said predetermined frequency but asynchronous with reference thereto, and means at each of said local receivers responsive to said heterodyning signal and to a selected one of said locally radiated signals for converting said locally radiated signal to a frequency within said established range.

14. A system for distributing television signals as defined in claim 13 in which the first-named means includes directional radiating means for confining its radiations in the immediate vicinity of the buldng.

15. In a distribution system for distributing television signals from a plurality of stations to a plurality of local receivers, each of said television signals including both sound and picture components in predetermined ratio to one another at said stations, comprising a plurality of master receivers pretuned respectively to selected frequencies, means coupled to said master receivers for radiating a plurality of local signals respectively modulated according to modulated signals received by said master receivers from said stations and on adjacent frequencies, means for altering the ratio of sound to picture components in said locally radiated signals, means for radiating a heterodyning signal along with said local signals on a frequency adjacent the frequencies of said local signals, a cavity resonator adjacent each local receiver and having such broad band characteristics as to resonate in response to said altered component ratio local signals as well as said heterodyning signal, a receiving antenna at each cavity resonator for feeding the altered component ratio local signals as well as the heterodyning signal to the cavity resonator, and means connecting each cavity resonator to its complementary local receiver to feed the latter with beat signals resulting from beating of the heterodyning signal with said altered component ratio local signals.

16. The combination of claim 1 wherein said building includes a metal duct system having openings communicating with various interior locations in said building for normally moving air through said building, each of said transmitters including a radiating antenna disposed adjacent said duct system for injecting said rebroadcast outputs into said duct system whereby said duct system acts as a waveguide for said rebroadcast signals, each of said local receivers including means disposed adjacent one of said duct openings for intercepting rebroadcast signals present in said duct system.

17. The combination of claim 2 wherein said passages and openings in said building include a duct system disposed within said building, said means for reradiating signals from said master receiver including radiating antenna means disposed within said duct system whereby said duct system acts as a waveguide for said reradiated signals.

References Cited in the file of this patent

UNITED STATES PATENTS

| | | |
|---|---|---|
| 1,461,064 | Martin | July 10, 1923 |
| 1,754,881 | Clement | Apr. 15, 1930 |
| 1,881,395 | Aull | Oct. 4, 1932 |
| 1,989,466 | Satterlee et al. | Jan. 29, 1935 |
| 2,028,212 | Heising | Jan. 21, 1936 |
| 2,421,017 | Deloraine et al. | May 27, 1947 |

(Other references on following page)

UNITED STATES PATENTS

| | | |
|---|---|---|
| 2,422,454 | Weiss | June 17, 1947 |
| 2,458,124 | Wilmotte | Jan. 4, 1949 |
| 2,481,870 | Potter | Sept. 13, 1949 |
| 2,491,480 | Davis et al. | Dec. 20, 1949 |
| 2,545,197 | Darling | Mar. 13, 1951 |
| 2,559,613 | Halstead | July 10, 1951 |
| 2,571,137 | Hotine | Oct. 16, 1951 |

OTHER REFERENCES

"A 500 Mc. Radio-Relay Distribution System for Television," RCA Review, July 1940.